US006823192B2

(12) United States Patent
Jou et al.

(10) Patent No.: US 6,823,192 B2
(45) Date of Patent: Nov. 23, 2004

(54) METHOD AND APPARATUS FOR QUICK PAGING IN A WIRELESS COMMUNICATION SYSTEM

(75) Inventors: Yu-Cheun Jou, San Diego, CA (US); Jun Wang, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 136 days.

(21) Appl. No.: 09/921,407

(22) Filed: Aug. 1, 2001

(65) Prior Publication Data

US 2002/0094827 A1 Jul. 18, 2002

Related U.S. Application Data

(60) Provisional application No. 60/261,454, filed on Jan. 12, 2001.

(51) Int. Cl.[7] .................................................. H04Q 7/20
(52) U.S. Cl. ....................... 455/458; 455/442; 370/331; 370/335
(58) Field of Search ................................ 455/458, 515, 455/434, 442, 436, 437, 438, 439, 453; 370/311, 332, 333, 331, 335, 252

(56) References Cited

U.S. PATENT DOCUMENTS

| | | | |
|---|---|---|---|
| 4,901,307 A | | 2/1990 | Gilhousen et al. |
| 5,101,501 A | | 3/1992 | Gilhousen et al. |
| 5,373,506 A | * | 12/1994 | Tayloe et al. ................ 370/311 |
| 5,826,172 A | * | 10/1998 | Ito et al. ..................... 340/7.44 |
| 5,854,785 A | * | 12/1998 | Willey ......................... 370/332 |
| 6,111,865 A | | 8/2000 | Butler et al. ................. 370/335 |
| 6,701,132 B1 | * | 3/2004 | Fukuzawa et al. ......... 455/67.16 |

FOREIGN PATENT DOCUMENTS

WO      0054442      9/2000

OTHER PUBLICATIONS

Kwang, "Analysis of Call Processing Capacity of Base Station in CDMA Cellular Network", Vehicular Technology Conference, 1999. VTC 1999—Fall. IEEE VTS 50th, Sep. 19, 1999, vol. 2, pp. 1278–1282.*

Sarkar et al. "Soft Handoff On The Quick Paging Channel", Global Telecommunications Conference, 1999, Globecom '99 Dec. 1999, Rio De Jeneiro, Brazil. vol. 5, pp. 2794–2798.*

Sakar et al. "Common–channel Soft Handoff In CDMA2000– The Paging Channel", IEEE Transactions on Microwave Theory and Techniques, Denver, Colorado. Jun. 2000, vol. 48, Issue 6. pp. 938–950.*

Sarker et al. "Soft Handoff on the Paging Channel in CDMA2000", Radio and Wireless Conference, 1999. RAW-CON 99. 1999 IEEE. Aug. 1999 Denver, Colorado. pp. 133–136.*

* cited by examiner

Primary Examiner—Charles Appiah
(74) Attorney, Agent, or Firm—Philip Wadsworth; Thien T. Nguyen; Sandra L. Godsey

(57) ABSTRACT

Method and apparatus for pseudo-synchronized paging to a mobile station in a wireless communication system. A number of paging repetitions is assigned, wherein a quick page message is repeatedly sent to a target mobile station for the number of paging repetitions. The number of paging repetitions is part of a paging instruction from a base station controller to a base station. The pseudo-synchronized method is used when the target mobile station is soft handoff.

5 Claims, 7 Drawing Sheets

METHOD AND APPARATUS FOR QUICK PAGING IN A WIRELESS COMMUNICATION SYSTEM

CROSS REFERENCE TO RELATED APPLICATIONS

This application claims the benefit of Provisional U.S. Application Ser. No. 60/261,454, entitled "METHOD AND APPARATUS FOR SYNCHRONIZATION OF QPCH SOFT HANDOFF," filed Jan. 12, 2001, which is incorporated herein by reference in its entirety for all purposes.

Reference To Co-Pending Application For Patent

The present invention is related to a co-pending U.S. Application for Patent entitled "CELLULAR COMMUNICATION SYSTEM WITH COMMON CHANNEL SOFT HANDOFF AND ASSOCIATED METHOD," by Edward G. Tiedemann, Jr. et al., having U.S. application Ser. No. 09/727,712, filed Nov. 30, 2000 and assigned to the assignee hereof.

BACKGROUND

1. Field

The present invention relates to communications systems. Specifically, the present invention relates to methods of providing quick pages in a wireless communication system.

2. Background

In a wireless communications system a base station pages a mobile station indicating that a call is pending. The paging signal is transmitted on a separate channel, referred to as a paging channel. While the paging channel may be implemented on a separate carrier frequency, in a spread spectrum system, such as a Code Division Multiple Access, CDMA, type system, a unique code is applied to paging messages, thus providing a paging channel.

The base station generates pages in response to instructions received from a Base Station Controller, BSC. In one embodiment, the BSC also instructs the base station to send a Quick Page, QP, signal. The OP signal is transmitted on a separate Quick Page Channel, QPCH. The quick page message may be one bit or may be a message made up of multiple bits.

A problem exists in generating QP messages when a mobile station is in soft handoff. During soft handoff, the BSC instructs those base stations in a neighborhood around the mobile station to transmit a QP message. After sending the QP message, each base station is instructed to page the mobile station. For each base station, the mobile station has an assigned paging slot. The loading of the base stations in the neighborhood may prevent one or all of the base stations from sending the corresponding page during the assigned paging slot. Therefore, there is a need for a method of providing quick pages while a mobile station is in soft handoff.

SUMMARY

According to one aspect, in a wireless communication system having a base station controller and a plurality of base stations, a method includes receiving a paging instruction from the base station controller at a base station of the plurality of base stations, the paging instruction specifying a number of paging repetitions; and transmitting a quick paging message to a target recipient of the paging instruction for the number of paging repetitions.

According to another aspect, in a wireless communication system having a base station controller and a plurality of base stations, a base station includes means for receiving a paging instruction from the base station controller at a base station of the plurality of base stations, the paging instruction specifying a number of paging repetitions, and means for transmitting a quick paging message to a target recipient of the paging instruction for the number of paging repetitions. In still another aspect, in a wireless communication system having a base station controller and a plurality of base stations, a mobile station includes a means for receiving a plurality of quick paging messages from the plurality of base stations, a means for receiving a first paging message from a first of the plurality of base stations, a means for receiving a second paging message from a second of the plurality of base stations, and a means for responding to at least one of the first and second paging messages.

DETAILED DESCRIPTION

The word "exemplary" is used exclusively herein to mean "serving as an example, instance, or illustration." Any embodiment described herein as "exemplary" is not necessarily to be construed as preferred or advantageous over other embodiments.

In a spread spectrum system, such as a Code Division Multiple Access, CDMA, communications system, signals are spread over a wide bandwidth via the use of a code, such as a Pseudorandom Noise, PN, spreading sequence. The "TIA/EIA/IS-95 Mobile Station-Base Station Compatibility Standard for Dual-Mode Wideband Spread Spectrum Cellular System," hereinafter referred to as "the IS-95 standard," and the "TIA/EIA/IS-2000 Standards for cdma2000 Spread Spectrum Systems," hereinafter referred to as "the cdma2000 standard," detail spread spectrum CDMA systems. Further, operation of a CDMA system is described in U.S. Pat. No. 4,901,307, entitled "SPREAD SPECTRUM MULTIPLE ACCESS COMMUNICATION SYSTEM USING SATELLITE OR TERRESTRIAL REPEATERS," assigned to the assignee of the present application for patent and hereby expressly incorporated by reference.

In one embodiment, such as a communication system consistent with the cdma2000 standard, a Quick Paging Channel, QPCH, is used to alert mobile stations to receive paging information, such as transmitted on a Forward Common Control Channel, F-CCCH or a Paging Channel, PCH.

Figure 1:
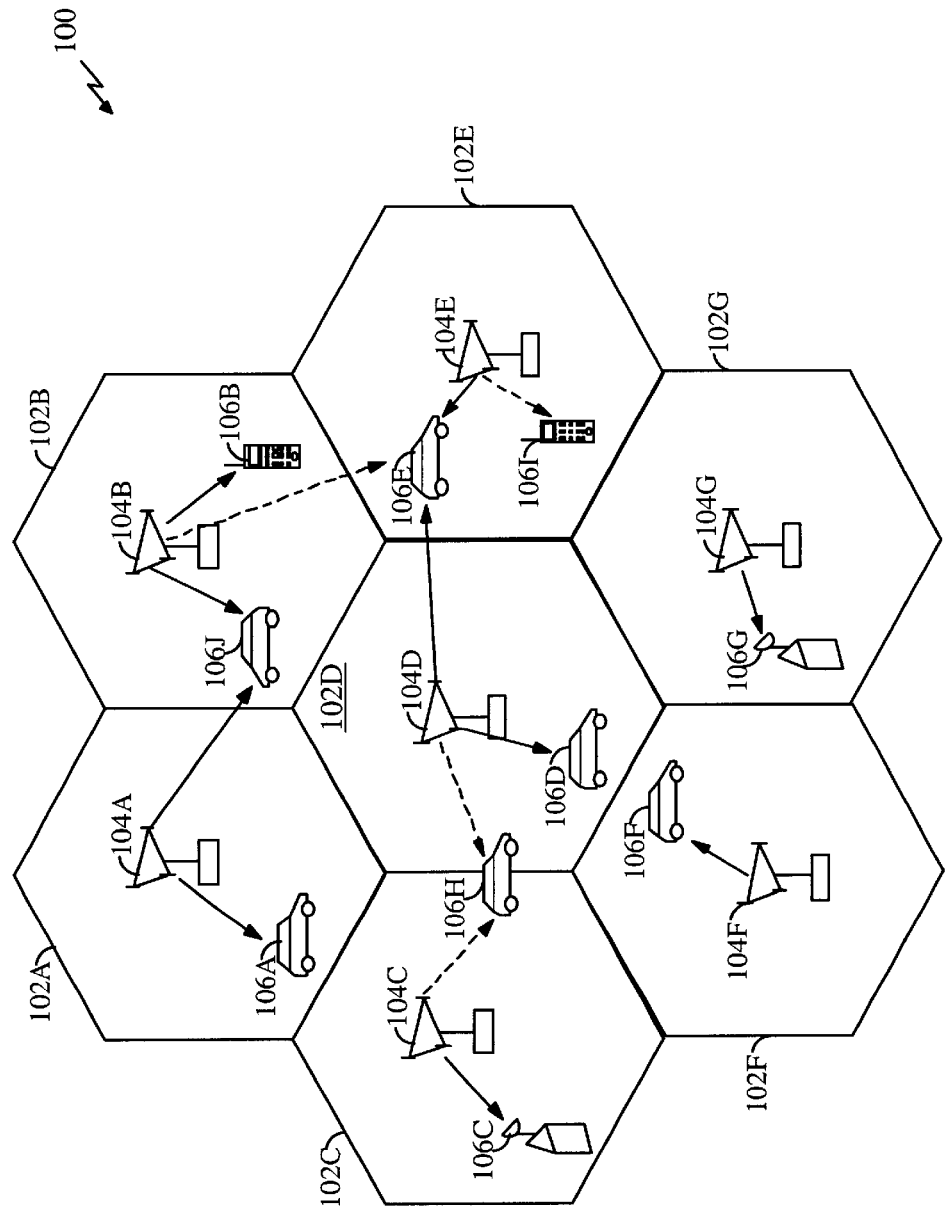
FIG. 1 is a portion of a wireless communication system.

FIG. 1 is a diagram of a communications system 100 that supports a number of users and is capable of implementing at least some aspects and embodiments of the invention. System 100 provides communication for a number of cells 102A through 102G, each of which is serviced by a corresponding base station 104A through 104G, respectively. In the exemplary embodiment, some of base stations 104 have multiple receive antennas and others have only one receive antenna. Similarly, some of base stations 104 have multiple transmit antennas, and others have single transmit antennas.

There are no restrictions on the combinations of transmit antennas and receive antennas. Therefore, it is possible for a base station 104 to have multiple transmit antennas and a single receive antenna, or to have multiple receive antennas and a single transmit antenna, or to have both single or multiple transmit and receive antennas.

Terminals 106 in the coverage area may be fixed (i.e., stationary) or mobile. As shown in FIG. 1, various terminals 106 are dispersed throughout the system. Each terminal 106 communicates with at least one and possibly more base stations 104 on the downlink and uplink at any given moment depending on, for example, whether soft handoff is employed or whether the terminal is designed and operated to (concurrently or sequentially) receive multiple transmissions from multiple base stations. Soft handoff in CDMA communications systems is well known in the art and is described in detail in U.S. Pat. No. 5,101,501, entitled "METHOD AND SYSTEM FOR PROVIDING A SOFT HANDOFF IN A CDMA CELLULAR TELEPHONE SYSTEM", which is assigned to the assignee of the present invention and incorporated by reference herein.

The downlink refers to transmission from the base station to the terminal, and the uplink refers to transmission from the terminal to the base station. In the exemplary embodiment, some of terminals 106 have multiple receive antennas and others have only one receive antenna. Similarly, some of terminals 106 have multiple transmit antennas and others have single transmit antennas. There are no restrictions on the combinations of transmit antennas and receive antennas. Therefore, it is possible for a terminal 106 to have multiple transmit antennas and a single receive antenna or to have multiple receive antennas and a single transmit antenna or to have both single or multiple transmit or receive antennas. In FIG. 1, base station 104A transmits data to terminals 106A and 106J on the downlink, base station 104B transmits data to terminals 106B and 106J, base station 104C transmits data to terminal 106C, and so on.

Figure 2:
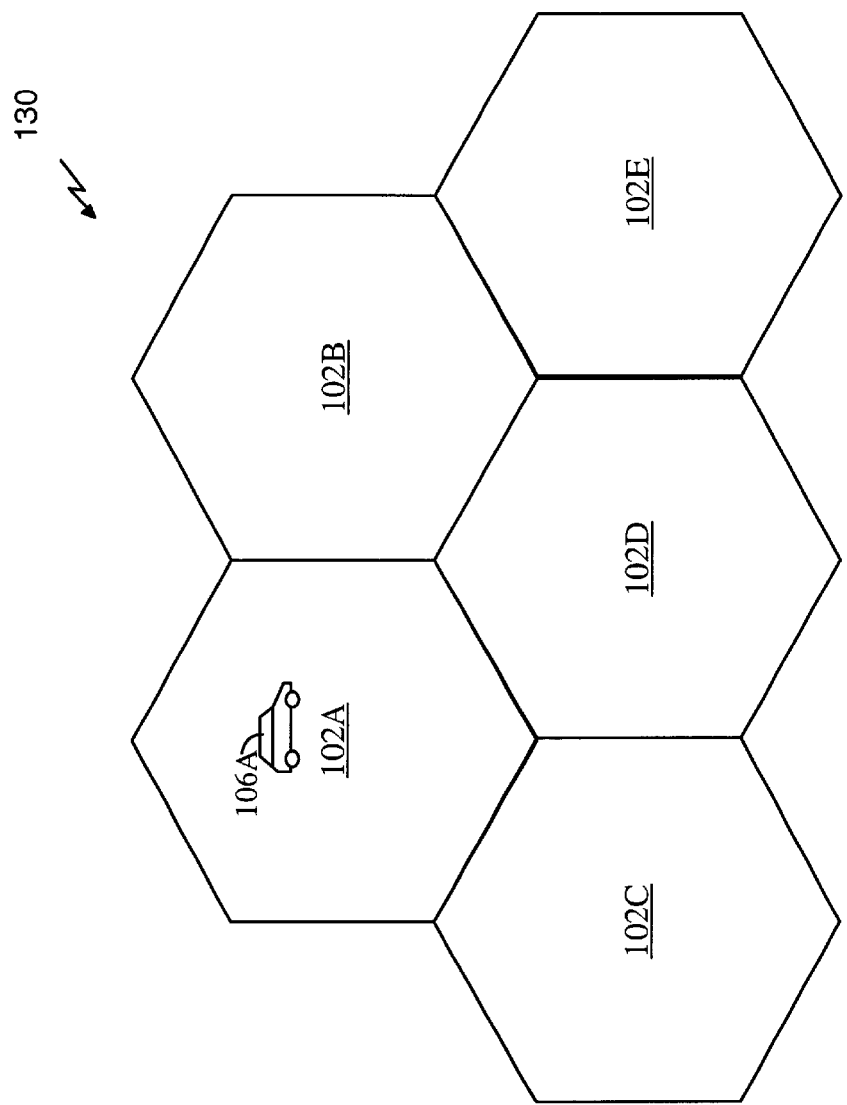
FIG. 2 is a portion of a wireless communication system.

FIG. 2 illustrates the neighborhood 130 around mobile station 106A including cells 102A, 102B, 102C, 102D, and 102E. The mobile station 106A is herein referred to as MS1. The neighborhood may be considered to include those base stations that are in range to communicate with mobile station 106A. The neighborhood determination is made by the Base Station Controller, BSC 120. The BSC 120 controls operation of the base stations within system 100 and interfaces with a Public Switching Telephone Network, PSTN, another wireless system, a data link, such as the Internet, or any of a variety of other access networks.

Figure 3:
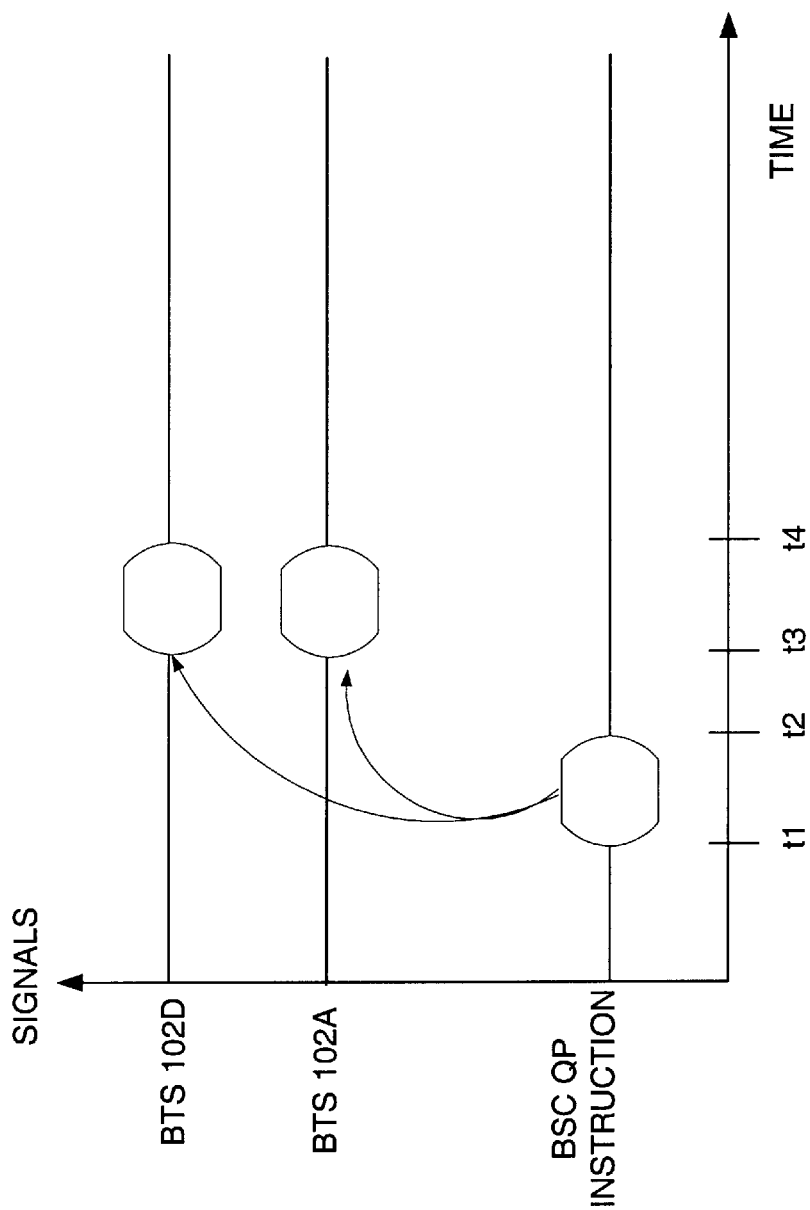
FIG. 3 is a timing diagram of a quick paging protocol.

FIG. 3 illustrates generation of Quick Paging, QP, messages in a wireless system 100. On a pending communication request for MS1, the BSC 120 generates an instruction to page MS1 and specifically to provide a QP message to MS1. These instructions are provided to multiple base stations within neighborhood 130. Illustrated are BTS 102A and BTS 102D as examples, however, BSC 120 may transmit the instruction to any of a number of base stations. The BSC 120 sends the instruction during the interval of time t1 to t2. In response to the instruction, the BTSs 102A and 102D generate a QP message during the interval of time t3 to t4. In one embodiment, the QP message is a one bit message. The QP message is sent on a QP channel, QPCH. Each of the base stations in the neighborhood 130 transmits a QP message during this interval. Subsequent to the QP message, each base station is instructed to send a page to MS1. As discussed hereinabove, this presents a problem as any one of the base stations within the neighborhood 130 may be loaded, having insufficient resources to page the MS1. In this case, such a base station may have to prioritize pages, or ignore the instruction from the BSC 120.

The MS1 receives the QP messages from the base stations in the neighborhood 130. The MS1 combines the QP messages, thus increasing the reliability of the information. Each base station that is not able, or chooses not to transmit the QP message to MS1 reduces the reliability of the message.

One embodiment solves this problem by implementing a mandatory scheme, wherein each base station in neighborhood 130 that receives the instruction from BSC 120 is required to send a QP message followed by a page message regardless of the loading of the base stations.

Figure 4A:
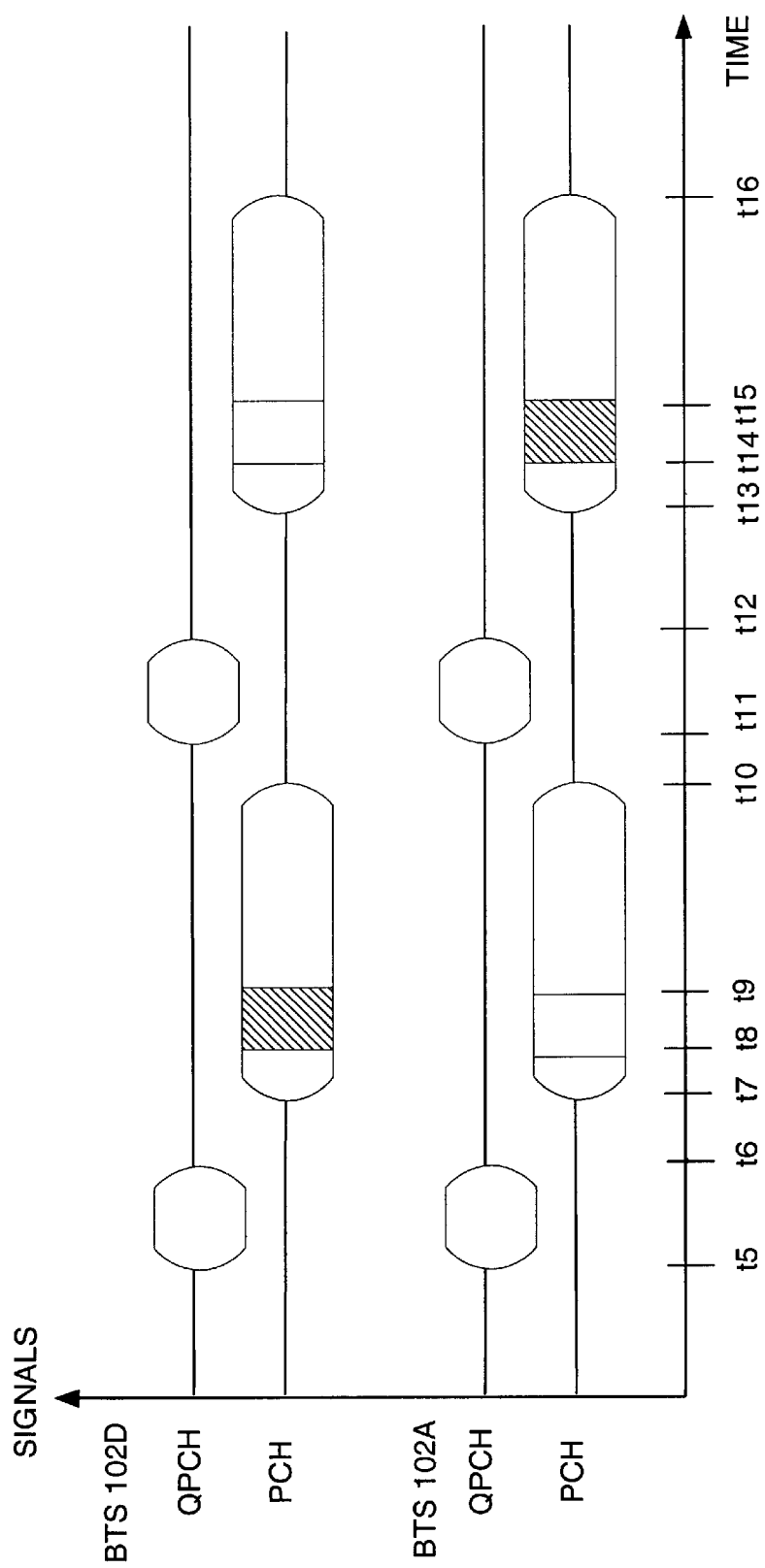
FIGS. 4A and 4B are timing diagrams of quick paging protocols during soft handoff.

An alternate embodiment provides repeated QP messages, allowing base stations multiple opportunities to send the page. Referring to FIG. 4A, again the BSC 120 has sent an instruction to BTSs 102A and 102D. In response, both base stations send QP messages during the interval of time t5 to t6. The instruction includes a number of retries, identified as N, wherein if N=1 a mandatory scheme is implemented. The paging interval of each base station begins at time t7 and continues to time t10 Within the paging interval, a time slot is assigned to the MS1, and other time slots are assigned to other mobile stations. The time slot assigned to MS1 is from time t8 to time t9. As illustrated in FIG. 4A, the BTS 102D has hatching during the MS1 paging slot to indicate transmission of the paging message during this slot. The loading of BTS 102D allowed the transmission. In contrast, BTS 102A was loaded so as to prevent transmission of the paging message during the time slot assigned to MS1, i.e. from time t8 to time t9. At a subsequent time from t14 to t15, also assigned to MS1, BTS102D does not transmit the paging message, however, at this time BTS102A allows transmission of the paging message. In this way, BTS102D sent the paging message at a first time, while BTS102A sent the paging message at a second time. According to one embodiment, two slots are designated between time t7 and t10 (the second slot is not shown) for paging messages. Similarly, two slots are designated between time t13 and t16 (the second slot is not shown) for paging messages.

Figure 4B:
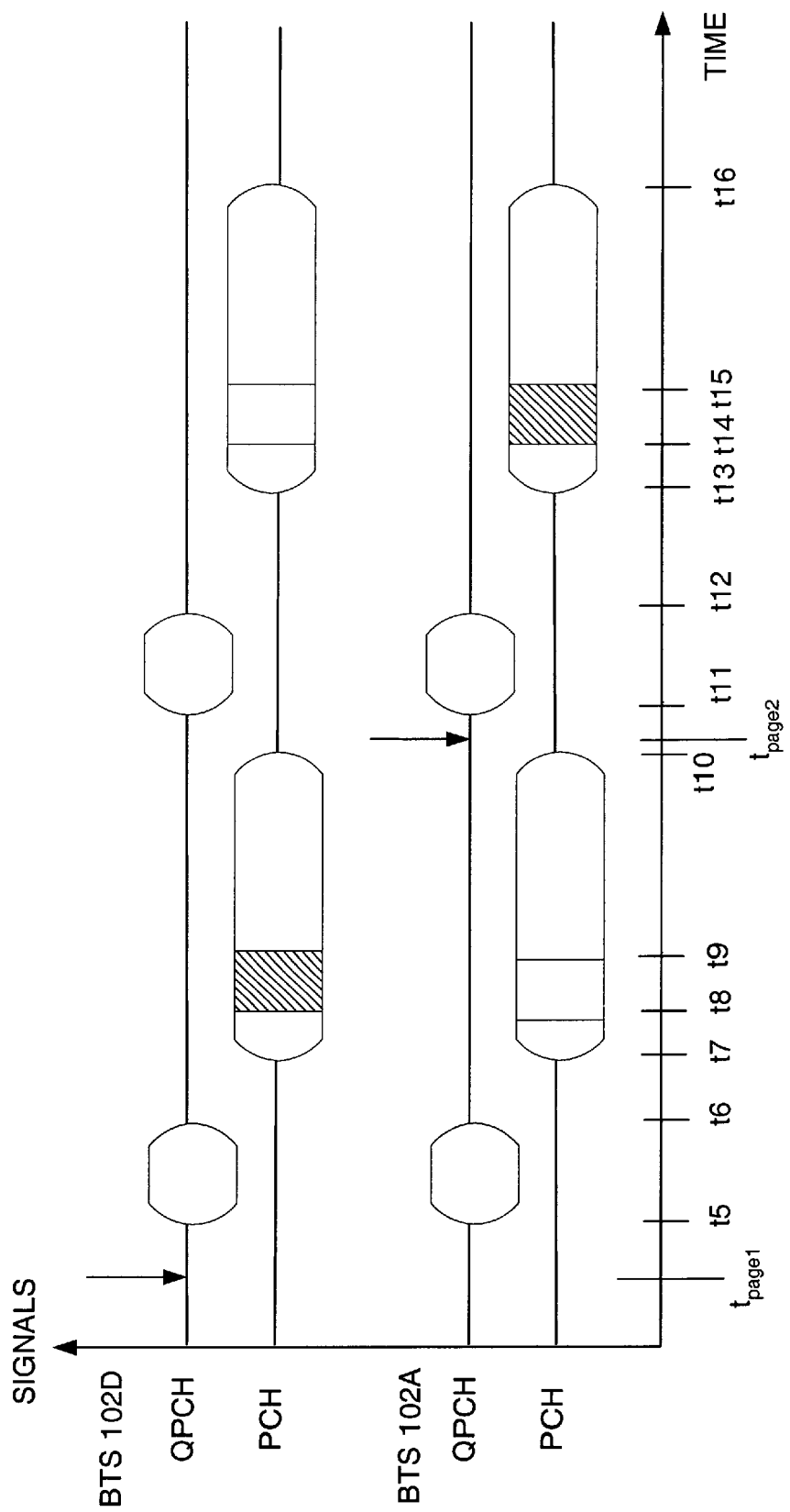

In an alternate embodiment, in response to the page message received from the BSC, each BTS calculates the available bandwidth for transmission. If a BTS has bandwidth to transmit the paging message in the next paging slot, the BTS sends a paging confirmation message to the BSC. The paging confirmation message identifies the transmitter as a BTS available to send the paging message to the MS during the next slot. As illustrated in FIG. 4B, the BTS 102D receives the paging message from the BSC 120 and determines there is sufficient bandwidth available to send the paging message to the target MS. Note that the BSC 120 also instructs the BTSs to send quick paging messages N times. The BTS 102D transmits a paging confirmation message to the BSC 120 at time $t_{page1}$. The BTS 102D then transmits a quick paging message during the time interval t5 to t6 and the paging message during the time interval t8 to t9. The BTS 102A also receives the paging message from the BSC 120 but determines there is not sufficient bandwidth available to send the paging message to the target MS. The BTS 102A transmits a quick paging message during the time interval t5 to t6. The transmission bandwidth of BTS102A changes subsequent to time t5 such that BTS 102A has sufficient bandwidth to transmit the paging message in a next slot. The BTS 102A sends a paging confirmation message to the BSC 120 at time $t_{page2}$. A quick paging message is sent from BTS 102A during the time interval from t11 to t12. The BTS 102A then sends the paging message during the next slot, i.e., time interval t14 to t15. The present embodiment allows each BTS to send a paging message during one of multiple time intervals. The BTS identifies each time interval during which the paging message is sent to the target MS. In this way, for each BTS, the BSC 120 may track transmission of the paging message.

The BSC may use this information to modify a quick paging soft-handoff list maintained at the BSC, BTS and MS. According to one embodiment, the BSC ignores those BTS having insufficient bandwidth to transmit the paging message, thus saving power consumption at the MS as the MS does not need to update the list as often.

Figure 5:
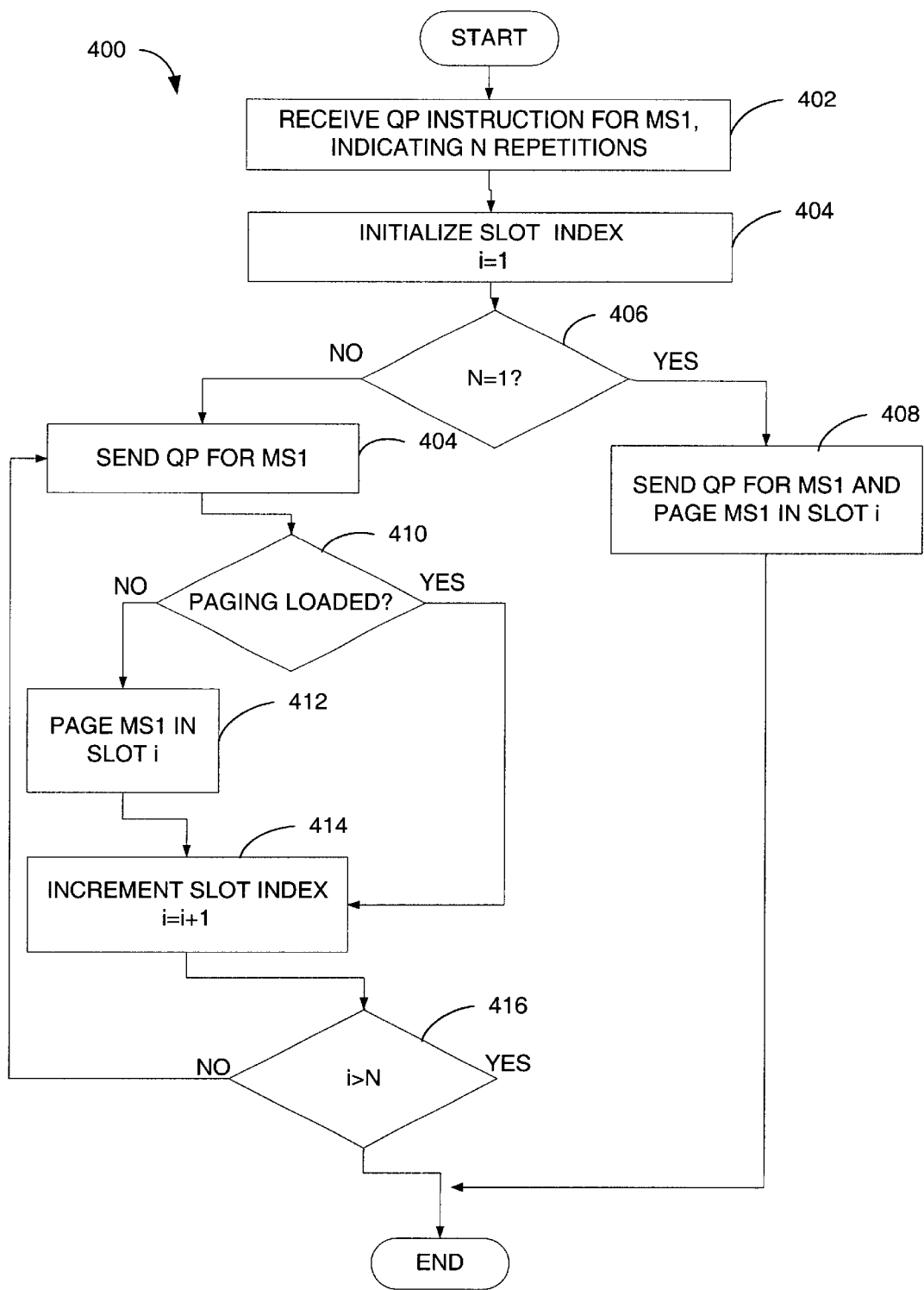
FIG. 5 is a flow diagram of quick paging control during soft handoff.

One embodiment for implementing the quick paging described hereinabove is illustrated in FIG. 5. The method 400 is performed in a base station or other control terminal, wherein at step 402 the base station receives a quick paging instruction for a given mobile station, MS1. The instruction also indicates a number of paging repetitions, identified as N. At step 404 the base station initializes a slot index i to the value N. At decision diamond 406 the base station determines if the number of paging repetitions is equal to 1. For the case of N=1, the base station sends the quick paging signal and then sends the page message in the first slot assigned to MS1, the target recipient of the page. As indicated in FIG. 5, the base station sends the quick paging message for MS1 and then sends the paging message in slot i at step 408. For the case of N=1, the paging is synchronized between all of the base stations, wherein each base station transmits the paging message during a same slot assigned to the target mobile station.

In contrast, if the number of paging repetitions does not equal one, processing continues to step 404 to send the quick paging message for MS1. The case of N>1 is referred to as a pseudo-synchronized paging scenario. At step 410 the base station determines the loading condition for pending transactions. If the paging slots available from the base station are congested, the base station increments the slot index at step 414. If the base station loading allows transmission of the page to MS1, then the page is sent during slot i at step 412. Processing then continues to step 414 to increment the slot index. At decision diamond 416, the index i is compared to the number of paging repetitions N, wherein if the number of paging repetitions is satisfied, the process ends. Else, processing returns to step 404 to send the quick page message to MS1. Note in one embodiment, once the base station transmits the paging message the process for ends for the target mobile station and no further quick page messages are sent.

Figure 6:
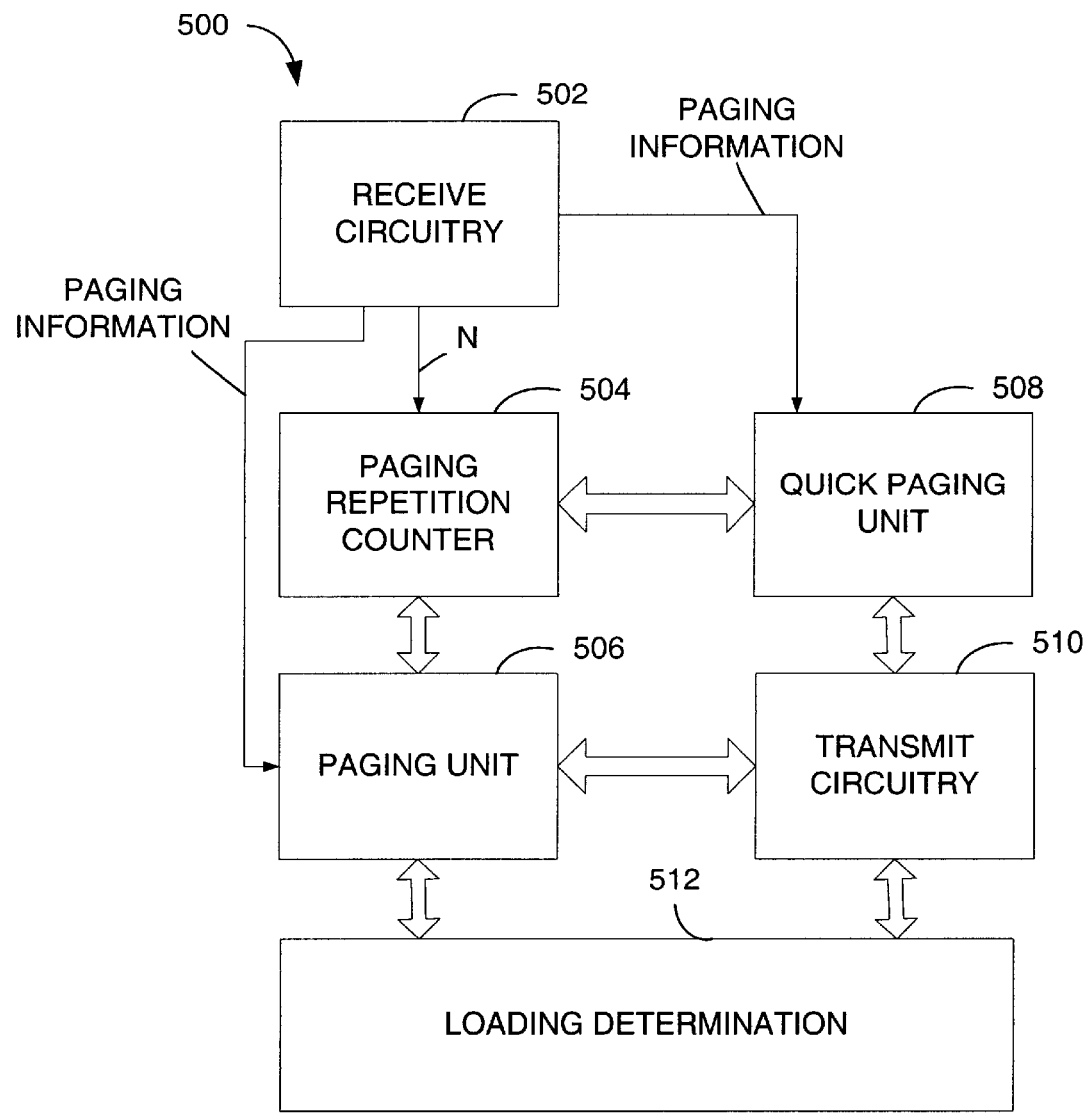
FIG. 6 is a base station supporting a quick paging protocol.

FIG. 6 illustrates a base station operative within a wireless communication system, adapted for implementing a pseudo-synchronized method of paging as in FIG. 5. The base station 500 includes receive circuitry 502 for processing received signals from a base station controller (not shown). The receive circuitry 502 provides the number of paging repetitions N to the paging repetition counter 504. The counter 504 is coupled to the paging unit 506 and a quick paging unit 508. The counter 504 provides the status of repetitions remaining for a paging instruction associated with a target mobile station. The quick paging unit 508 uses this information to determine the number of times to send the quick page message. The paging unit 508 receives loading and scheduling information from the loading determination unit 512. The loading determination unit 512 is also coupled to the transmit circuitry 510 and determines if the loading will allow a page to the target recipient. The quick paging unit 508 and the paging unit 506 provide paging information to the transmit circuitry 510. The quick paging unit 508 initiates transmission of quick page messages for the number of paging repetitions as instructed by the base station controller (not shown).

In one embodiment, a mobile station operating within a wireless communication system receives and processes the quick paging messages from at least two base stations while in soft handoff. The mobile station then receives and processes a first paging message from a first base station, wherein the first paging message is received during a transmission cycle of the first base station. During a subsequent cycle, the mobile station receives a second paging message from a second base station. The mobile station then processes the paging information and determines a response with respect to the first and second base stations. The receiving and processing may be performed by computer-readable instructions stored in memory resident to the mobile station. Also, the receiving and processing may be performed by dedicated hardware, firmware, or a combination thereof.

As disclosed hereinabove, a method for processing paging messages in a wireless system allows for individual loading conditions of the base stations in communication with a mobile station. By designating a number of paging repetitions, a base station is not prevented from sending a paging message due to loading, but rather may send the page when the loading allows it.

Thus a variety of methods have been illustrated hereinabove for paging in a wireless system. Each method finds application according to the design and resource requirements of a given system. While the various embodiments have been described with reference to a CDMA type spread spectrum communication system, the concepts are applicable to alternate spread spectrum type systems, as well as other type communication systems. The methods and algorithms presented hereinabove may be implemented in hardware, software, firmware, or a combination thereof. For example, using the MMSE approach to a non-time gated pilot, the equations for solving for the combiner weights may be performed in software or using a Digital Signal Processor, DSP, to perform the calculations. Similarly, the adaptive algorithms may be implemented in software in the form of computer readable instructions stored on a computer readable medium. A Central Processing Unit, such as a DSP core, operates to perform the instructions and provide signal estimates in response. Alternate embodiments may implement hardware, such as an Application Specific Integrated Circuit, ASIC, where feasible.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CDROM, or any other form of storage medium known in the art. An exemplary storage medium is coupled to the processor such the processor can read information from, and write information to, the storage medium. In the alternative, the storage medium may be an integral part of the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. In a wireless communication system having a base station controller and a plurality of base stations, a method comprising:

receiving a paging instruction from the base station controller at a base station of the plurality of base stations, the paging instruction specifying a number of paging repetitions; and transmitting a quick paging message to a target recipient of the paging instruction for the number of paging repetitions, the target recipient being in soft handoff; and wherein if the number of paging repetitions is one, transmitting a paging message to the target recipient during a next transmission slot assigned to the target recipient.

2. The method as in claim 1, further comprising:

determining a loading condition of the base station; and transmitting a paging message to the target recipient within the number of paging repetitions.

3. In a wireless communication system having a base station controller and a plurality of base stations, a base station, comprising:

means for receiving a paging instruction from the base station controller at a base station of the plurality of base stations, the paging instruction specifying a number of paging repetitions;

means for transmitting a quick paging message to a target recipient of the paging instruction for the number of paging repetitions, wherein the target recipient is in soft handoff; and wherein if the number of paging repetitions is one, transmitting a paging message to the target recipient during a next transmission slot assigned to the target recipient.

4. The base station as in claim 3, further comprising:

means for determining a loading condition of the base station; and means for transmitting a paging message to the target recipient within the number of paging repetitions.

5. A method for a wireless communication system, comprising:

receiving a paging instruction specifying a number of paging repetitions for a target recipient in soft handoff with a base station;

determining a loading condition of the base station;

transmitting a quick paging message to the target recipient during a first and successive time slots until the number of paging repetitions are exhausted and the loading condition of the base station is below a loading condition threshold.

* * * * *